United States Patent Office 3,173,846
Patented Mar. 16, 1965

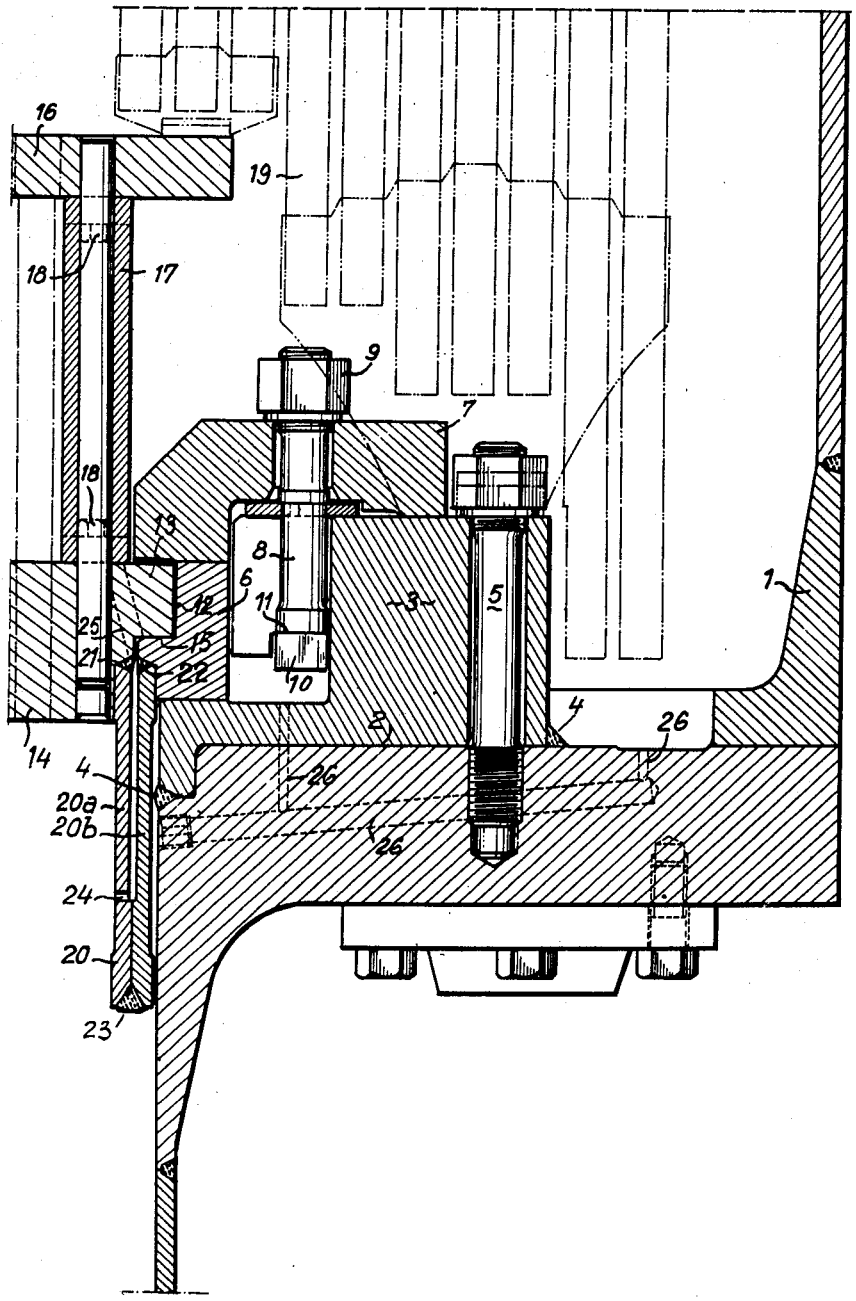

3,173,846
DEVICE FOR SUPPORTING THE BED OF A NUCLEAR REACTOR WHICH IS COOLED BY A CIRCULATING LIQUID
Michel Chauvin, Gentilly, and Jean-Claudius Margueron, Chatou, France, assignors to Commissariat à l'Énergie Atomique, Paris, France
Filed Apr. 2, 1962, Ser. No. 184,416
Claims priority, application France, Apr. 10, 1961, 858,182
3 Claims. (Cl. 176—87)

The present invention relates to nuclear reactors and relates more particularly to a device for affording the support of the core bed by the reactor vessel with a relative sealing, the leakage section of which is perfectly determined.

It applies more particularly but not exclusively, to a supporting system of this type adapted for use in a reactor of the "high-speed neutron" type in which the cooling fluid is in the form of a metal in the liquid state, such as molten sodium for example.

It is known that, in general, the density of the neutron flux and consequently the creation of heat in the reactor is greater in the central portion of the core and diminishes with the distance from the centre thereof. The resulting differences in temperature between its various parts thus cause stresses in the structural elements and more particularly in the supporting plate which forms the bed which supports the fuel-element assemblies.

In order to avoid subjecting the bed to inadmissible stresses, therefore, it is caused to rest on a projection provided on the inner face of the sealing vessel of the reactor and a slight clearance is left between the walls of this vessel and the edges of the bed in order to permit its free expansion under the influence of the temperature.

Nevertheless, the diameter of the supporting plate constituting this bed, which is generally fairly large, and the nature of the steel used, do not permit contact surfaces to be obtained which are capable of sliding perfectly the one on the other, so that there is a risk of rapid binding which, as a result of the local deformation caused, leads to leakages between the bed and the vessel due to the difference in the pressures on either side of these members. Moreover, the particularly active nature of the fluid here in question and the cavitation phenomena which arise in the centre of its flow, likewise contribute in a large measure to the progressive deterioration in the contact between the vessel and the bed.

The present invention relates to a device for supporting the bed of a nuclear reactor which enables these disadvantages to be avoided while eliminating any possibility of uncontrolled leakage of the cooling liquid.

According to a main feature, the invention consists not only in causing the bed of the reactor to rest on an annular and continuous projection on the vessel in such a manner as to bring into contact two plane metallic parts which may have any surface condition, but also in mounting between the bed and the vessel a flexible metal skirt of which the two ends, folded one over the other, are rigidly and respectively secured on the one hand to the bed and on the other hand to the vessel.

In this manner, the pressure is the same on both sides of the contact surfaces between the bed and the vessel and this, in particular, prevents the appearance at this point of the cavitation phenomena mentioned above. Nevertheless, it is possible for a small quantity of the cooling liquid to penetrate inside the metal sealing skirt because the bed is simply placed with play on the vessel and the surface condition of the two parts in contact does not necessarily permit a perfect sliding of these one on the other when there is differential expansion between the two parts. In consequence, certain difficulties arise, particularly in effecting the complete emptying of the vessel when the reactor is shut down.

For this purpose, and according to another feature of the invention, the metal skirt is pierced with a small number of holes of small diameter in such a manner as to produce a series of calibrated outlets for the cooling fluid which are carefully determined as a function of the main liquid flow.

Apart from the above features, the invention consists of certain other features which will be discussed more explicitly below. In any case it can be well understood with reference to the following additional description and to the accompanying drawing, both given by way of example.

The single figure of the drawing illustrates, in vertical section, the part of a nuclear reactor formed according to the invention.

As can be seen in this figure, a portion of the tank 1 of the reactor is illustrated diagrammatically. This comprises a horizontal portion 2 corresponding to a reduction in its cross section. Resting on this portion 2 is an intermediate flange 3 which is rigidly connected to the vessel by means of welds such as 4 or fixing bolts 5 uniformly arranged over the circumference of the flange. Mounted on this is a ring 6 which is held bearing against it by a series of yokes 7 only one of which appears in the plane of the figure. Each yoke is fixed to the flange 3 by means of bolts 8 and nuts 9, each bolt comprising a rectangular head 10 which engages in a groove 11 formed inside the flange with a view of affording the locking thereof. Between the ring 6 and the yokes 7 there is also formed a sort of annular groove 12 in which the edge 13 of the bed 14 of the reactor comes to rest with clearance. Thus this rests by its own weight on the projection 15 on the ring 6 bounding the lower portion of the groove 12.

Mounted above the bed 14 is a grid 16, the purpose of which is to guide the ends of the fuel assemblies, the spacing between the grid and the bed being afforded by distance pillars 17 fixed respectively to the bed and to the grid by bolts such as 18. The figure also illustrates a series of cylindrical casings or sleeves such as 19 constituting a neutron protection for the reactor.

Between the bed 14 and the ring 6 there is mounted a metal skirt 20 in two parts 20a and 20b respectively fixed by one end to the bed and to the ring rigidly secured to the tank 1, by continuous welding round these members in the zones bearing the reference numerals 21 and 22 in the drawing. The two parts 20a and 20b are also connected to one another, likewise by continuous welding of the lower ends 23.

As a result of this arrangement, the surface condition of the part of the bed 13 and of the ring 6 in contact along the projection 15 no longer plays a part in affording the sealing with respect to the liquid sodium. Actually, if the sliding of the one on the other is not perfect, a slight leakage of sodium may occur as a result of creep between these two parts, and be collected inside the skirt or sealing bellows 20.

Nevertheless, in order to permit the evacuation of the small quantities of sodium which have penetrated inside the bellows as a result of defective contact between the bed 14 and the ring 6, when the vessel of the reactor is emptied completely, a limited number of holes of small diameter such as 24 is made through the skirt 20, at the lower portion thereof. Similarly, in order to permit the flow of the fluid which enters through these holes in normal operation, narrow ducts 25 are formed through the bed, preferably equal in number to that of the holes 24.

In this manner the sealing obtained by the bellows is partially destroyed, but this does not involve any disadvantage because perfectly calibrated and predetermined leakages are introduced which very rapidly limit the effects of any cavitation at the point where the bed bears on the vessel.

Finally, other discharge passages 26 for the sodium are provided through the vessel itself being arranged in such a manner as not to have any low point at which the sodium could accumulate.

Needless to say, the invention is not in any way limited to those means of application nor to those means of construction of its various parts which have been mentioned more particularly and which have only been given by way of example.

We claim:

1. A device for supporting the bed of a nuclear reactor cooled by a corrosive liquid metal coolant, a vessel for the reactor, an interior annular shoulder in said vessel, an annular ring mounted on said shoulder, a horizontal anular projection within said ring, a bed mounted on said projection, a flexible metal skirt depending between said ring and said bed, a pair of spaced adjacent edges for said skirt one of said edges being sealed to said ring and the other of said edges being sealed to said bed, and a plurality of calibrated outlets in said skirt for the liquid metal coolant.

2. A device as described in claim 1, said skirt comprising two similar parts sealed together along adjacent edges away from said ring and said bed.

3. A device as described in claim 1 including an annular flange connected to said vessel, said shoulder being formed on said flange and a plurality of yokes bolted to said flange and holding said ring on said shoulder.

References Cited by the Examiner
UNITED STATES PATENTS

| | | | |
|---|---|---|---|
| 2,004,469 | 6/35 | Leach | 164—81 X |
| 2,152,266 | 3/38 | McNeal | 165—70 X |
| 2,915,446 | 12/59 | Liljeblad | 176—58 |

CARL D. QUARFORTH, *Primary Examiner.*

REUBEN EPSTEIN, *Examiner.*